(12) United States Patent
Nakagawa (10) Patent No.: US 7,254,269 B2
(45) Date of Patent: Aug. 7, 2007

(54) CHARACTER RECOGNITION SYSTEM

(75) Inventor: Shinya Nakagawa, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 10/128,773

(22) Filed: Apr. 19, 2002

(65) Prior Publication Data

US 2003/0059115 A1 Mar. 27, 2003

Related U.S. Application Data

(63) Continuation of application No. PCT/US01/26927, filed on Aug. 30, 2001.

(30) Foreign Application Priority Data

Aug. 31, 2000 (JP) .............................. 2000-262096

(51) Int. Cl.
*G06K 9/48* (2006.01)
(52) U.S. Cl. ..................................................... 382/197
(58) Field of Classification Search ................ 382/197, 382/225
See application file for complete search history.

(56) References Cited

U.S. PATENT DOCUMENTS

| | | | | |
|---|---|---|---|---|
| 4,589,142 A | * | 5/1986 | Bednar | ........................ 382/226 |
| 4,718,103 A | * | 1/1988 | Shojima et al. | ............. 382/189 |
| 4,773,099 A | * | 9/1988 | Bokser | ........................ 382/225 |
| 5,335,289 A | * | 8/1994 | Abdelazim | ................... 382/177 |
| 5,937,093 A | | 8/1999 | Takahashi | .................... 382/226 |
| 5,943,443 A | | 8/1999 | Itonori et al. | |
| 6,260,051 B1 | | 7/2001 | Katayama et al. | |

FOREIGN PATENT DOCUMENTS

| | | |
|---|---|---|
| EP | 0 672 995 A2 | 9/1995 |
| EP | 0 790 574 A2 | 8/1997 |
| EP | WO 98/19268 | 5/1998 |
| JP | 4-286087 | 7/1990 |
| JP | 2-186490 | 10/1992 |

* cited by examiner

*Primary Examiner*—Joseph Mancuso
*Assistant Examiner*—Jonathan Schaffer (57) ABSTRACT

In the prior art, in character recognition of a language having many characters, such as Japanese, a feature vector is extracted from an input pattern, distances between the feature vector and reference vectors are calculated, and a character corresponding to a reference vector having the smallest distance value is selected as a recognized character. However, in the character recognition of a language having many characters, since the number of the reference vectors to be compared is large, there is a limit in improvement of processing speed of the character recognition. In the present invention, reference vectors corresponding to target characters are classified into plurality of classes based on occurrence frequencies of characters. When distances between the feature vector and the reference vectors are calculated, a comparison is sequentially made from the reference vectors of a class having a high character occurrence frequency, so that the processing speed of the character recognition is improved.

17 Claims, 6 Drawing Sheets

CHARACTER RECOGNITION SYSTEM

CROSS-REFERENCE TO RELATED APPLICATIONS

The present application is a continuation of International Patent Application No. PCT/US01/26927, filed Aug. 30, 2001.

BACKGROUND OF THE INVENTION

1. Field of the Invention

The present invention relates to character recognition of a language having many characters, such as Japanese, Chinese, or Korean.

2. Description of the Related Art

In character recognition of a language having many characters, such as Japanese, Chinese, or Korean, there is adopted such a method that features are extracted from an input pattern to extract a feature vector, distances between the feature vector and reference vectors previously extracted for all target characters to be recognized are calculated, and a character corresponding to a reference vector having a smallest distance value is selected as a recognized character.

Japanese Patent Unexamined Publication No. Hei. 2-186490 discloses a system for performing character recognition by calculating distances between a vector extracted from a pattern of an input character and reference vectors extracted from patterns of previously stored target characters. In this system, the Euclidean distance between the vector of the input pattern and the reference vector is calculated and is compared with a predetermined threshold to perform character recognition.

Japanese Patent Unexamined Publication No. Hei. 4-286087 discloses a system for performing character recognition by extracting a feature vector from an input character pattern and calculating the Euclidean distance from a reference vector stored in a feature dictionary, in which the feature dictionary is divided into clusters for respective similar character categories, a distance between the feature vector of the input pattern and a reference vector representing each cluster is calculated, and detailed recognition processing is performed as to reference vectors of similar characters belonging to a cluster having a smallest distance.

In general, in a language having many characters, such as Japanese, Chinese, or Korean, a very large number of features, for example, several hundreds or several thousands features, are used to improve recognition accuracy. In a character recognition system based on a distance from a reference vector corresponding to each candidate character, in general, it takes a calculation time in proportion to the number of candidate characters and the number of features, so that a drop in recognition speed becomes a problem. Specifically, as a distance, there is the Euclidean distance, the weighted Euclidean distance, the city block distance, or the like, $$\text{Euclidean distance} \quad \sum_{i=1}^{m}(x_i - r_i)^2$$

$$\text{weighted Euclidean distance} \quad \sum_{i=1}^{m} w_i(x_i - r_i)^2$$

$$\text{city block distance} \quad \sum_{i=1}^{m}|x_i - r_i|$$

Where, $X=(x_1, \ldots, x_m)$: feature vector of input pattern $R_j=(R_{j1}, \ldots, r_{jm})$: reference vector of j-th candidate character $W=(w_1, \ldots, w_m)$: weight vector of feature m: the number of features n: the number of target characters In any case, it takes calculation of the distance element $(x_i-r_1)^2$, $|x_1-r_i|$ with respect to the respective features n×m times, that is, (the number of candidate characters)×(the number of features) times.

In the foregoing Japanese Patent Unexamined Publication No. Hei. 4-286087, a calculation of the Euclidean distance is restricted to the similar character cluster, so that the processing speed is improved. However, predictions are that it is difficult to properly determine a representative vector as a standard of selection of the similar character cluster, and predictions are that recognition accuracy is lowered according to the quality of the representative vector.

SUMMARY OF THE INVENTION

An object of the present invention is to improve the speed of character recognition without lowering recognition accuracy even in a case where the number of features to be used is large in a language in which the number of candidate characters is large.

According to an aspect of the present invention, there is provided a character recognition system having the following structure. That is, in the character recognition system in which character recognition is performed by comparing distances between a feature vector extracted from an input pattern and reference vectors of previously stored target characters, all characters are classified into plurality of classes based on occurrence frequencies of the target characters, there are provided a dictionary storage device for storing the reference vectors for each of the classes and a computer, and the computer is programmed to calculate distances between the feature vector and the reference vectors of plurality of characters belonging to a class having a highest character occurrence frequency among the plurality of classes, and to select, when there is a distance smaller than a class threshold determined for the class, a character of a reference vector corresponding to the distance as a character candidate. As the distance from the reference vector, although the Euclidean distance, the weighted Euclidean distance, the city block distance or the like is used, the term "distance" is generally used here.

The occurrence frequencies of the target characters are calculated as statistical information from a set of a large number of documents in text format (this is referred to as a text corpus), such as past news articles, and the present inventors obtained the occurrence frequencies from the text corpus composed of about twenty million characters for each language and use them. According to this invention, all characters are classified into the plurality of classes based on the occurrence frequencies of the target characters, the reference vectors are stored in the dictionary for each of the classes, distance calculation is made between the feature vector extracted from the input character pattern and the reference vectors of the plurality of characters belonging to the class having the highest character occurrence frequency among the plurality of classes, and when a distance value satisfy within a certain threshold, the character is selected as the character candidate. According to the statistics obtained by the inventor, for example, in the case of Japanese, 382 characters belonging to the highest class in the occurrence frequency occupy about 80% of the text corpus. Accordingly, it is expected that also in a document, characters of about 80% are contained in the 382 characters of the highest frequency class. The present invention uses the bias of the statistical character occurrence frequency like this. First, only a character set belonging to the highest class in the occurrence frequency is targeted to recognize, and in the case where an excellent recognition result is obtained, recognition processing for remaining low occurrence frequency character sets are omitted, so that the speed of the character recognition processing is improved. Actually, programming is made so that the target character set is divided into plurality of target character sets, recognition processing is performed in the order of high frequency, and recognition processing for a set having a frequency lower than a set in which an excellent result has been obtained is omitted.

According to another aspect of the present invention, when there is no distance smaller than the class threshold, distances between the feature vector and the reference vectors of plurality of characters belonging to a class having a second highest character occurrence frequency are calculated, and when there is a distance smaller than a second class threshold determined for the class, a character of a reference vector corresponding to the distance is selected as a character candidate.

According to a still another aspect of the present invention, for the purpose of improving the speed also in the distance calculation as to one of the reference vectors, a process of calculating a distance value by accumulating distance elements as to all the features is made a calculation of an accumulated distance value using accumulation of n feature elements, (1) the accumulated distance value is compared with a character candidate selection threshold, (2) if it is not larger than the threshold, distance elements of next n feature elements are accumulatively calculated, the procedures of (1) and (2) are repeated, and when the accumulated distance value exceeds the character candidate selection threshold, it is judged that the reference vector is out of candidate, and a comparison with a next reference vector is started so that a processing time is shortened. Further, according to the present invention, by changing the order of accumulated distance elements, omission of a distance calculation process based on the accumulated distance value is effectively performed. Specifically, all training patterns of all target characters are used, a distribution of distance elements with respect to the respective features is obtained, and accumulation of the distance elements is performed in the descending order of its average value. As sorting of distance elements like this, there is a method of performing a common sort of reference vectors of all target characters, a method of performing a sort for each of the reference vectors in the descending order of distribution average of the distance elements, or the like.

The feature vector is extracted from a training pattern of all target characters, and the reference vector is prepared as a vector of, for example, with respect to Japanese, several hundreds dimensions. When a distribution of the distance elements for each dimension (that is, each feature) with respect to all the characters is observed, that the average of the distance elements is large means that the feature of the dimension contributes so as to increase the distance value of all. In the case of a correct character, since it is expected that the distance value becomes small, it can be said that the feature of the dimension like this is an effective feature for judging that a character is out of a candidate at an early stage. Accordingly, an average of distance elements for each dimension with respect to all the characters constituting the reference vectors is extracted from the training data in advance, and vectors in which the feature values of the respective reference vectors are sorted in the descending order of the average value are prepared. Also with respect to the feature vector extracted from the input pattern, a vector sorted in this order is prepared, and in the distance calculation of one reference vector and the feature vector, accumulation of distance elements is performed in this order. For example, first, an accumulated distance value in which distance elements up to 50 dimensions are accumulated is calculated, and if this reaches a threshold, it is judged that this reference vector is a character out of a candidate, and a comparison with a next reference vector is started. By doing so, since the recognition processing can be made to proceed without calculating distance elements of all of several hundreds dimensions, a time of the recognition processing can be shortened.

Further, according to a still another aspect of the present invention, the computer is programmed to dynamically set a distance value of a character candidate having an m-th (m is the number of character candidates to be selected) smallest distance value as a character candidate selection threshold.

Further, according to a still another aspect of the present invention, a similar character dictionary for providing characters having similar characteristics to arbitrary characters is included, and the computer is programmed to take out a character similar to each of the character candidates from the similar character dictionary in response to selection of the plurality of character candidates, to calculate distances between the feature vector to be recognized and reference vectors of the similar characters, to sort distance values of the plurality of character candidates and distance values of the similar characters, and to select a predetermined number of characters in ascending order of distance as recognition character candidates. By this, also in the case where a correct character exists in a low frequency character candidate class which has been omitted, it becomes possible to make it contained in candidates as a similar character, and a drop in recognition accuracy can be suppressed.

DETAILED DESCRIPTION OF THE PREFERRED EMBODIMENTS

Figure 1:
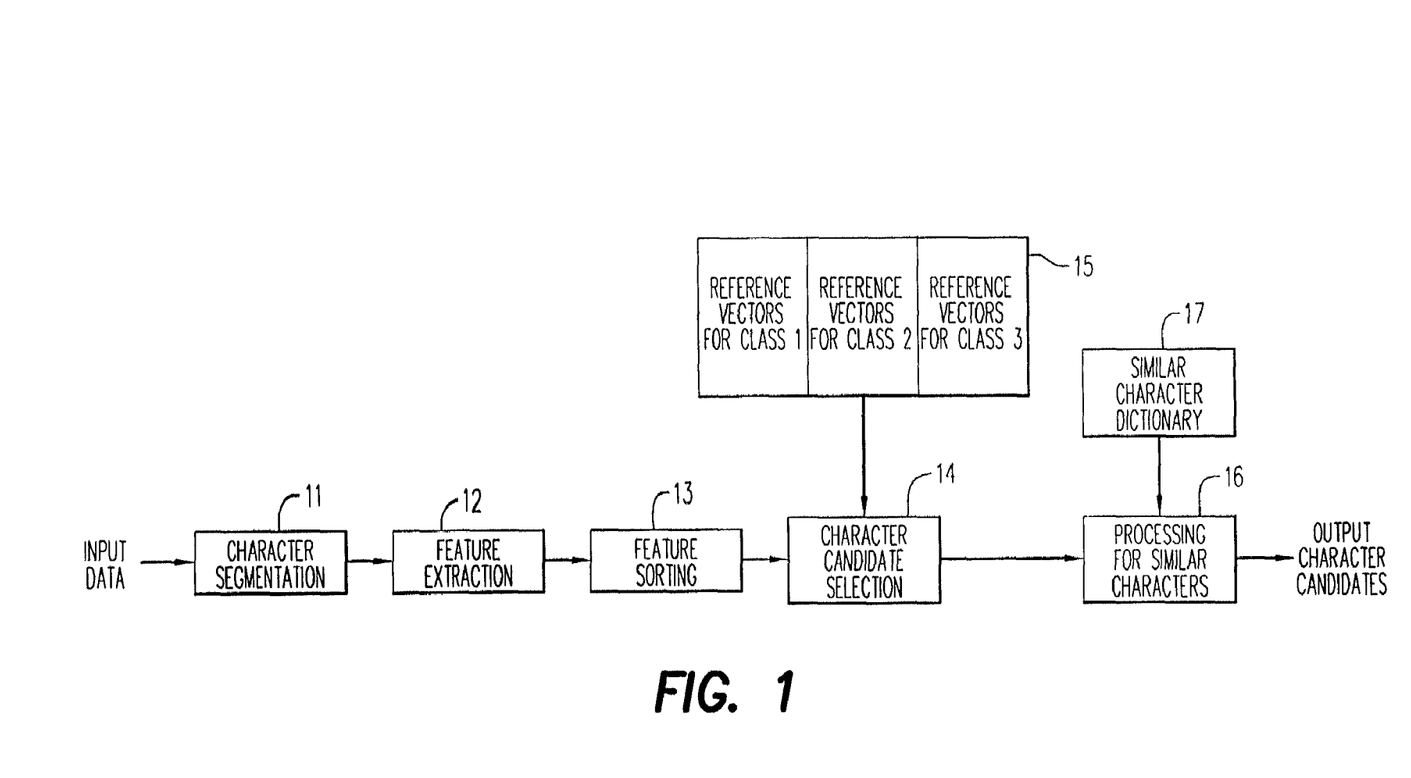
FIG. 1 is a functional block diagram showing the whole structure of a character recognition system of an embodiment of the present invention.

Embodiments of the present invention will next be described with reference to the drawings. FIG. 1 is a functional block diagram showing the whole structure of an example of a Japanese character recognition system using the present invention. This system is realized by a program running on a general purpose personal computer or a work station. In general, this sort of program is called an OCR (Optical Character Recognition) program. A typical input pattern to the system is image data obtained by scanning a document by an optical scanner.

When the input pattern is received, a character segmentation portion 11 of the OCR program segments characters out of data in bit map format. The character segmentation itself is a function incorporated in a conventional OCR program. The image data segmented in an unit of a character is sent to a feature extraction portion 12, and an inclination, width, curvature, area, and other features of a character line are extracted. In this embodiment, with respect to Japanese, 200 features are extracted for one character. Accordingly, the input pattern is expressed by a vector of 200 dimensions as in the following expression, and is called a feature vector.

$$x=(x_1, x_2, \ldots, x_{200})$$ [Numerical Expression 1]

The feature vector extracted in this way is sent to a feature sorting portion 13, sorting of features is performed in accordance with a list of elements based on average distance described later to generate a new vector, it is sent to a character candidate selection portion 14, and the weighted Euclidean distance as to each of reference vectors of plurality of target characters stored in a reference character dictionary 15 is calculated.

Here, the reference character dictionary 15 will be described with reference to FIG. 2. A reference vector as to a certain character is obtained by extracting feature vectors as to an image pattern of various type faces and sizes of the character and averaging them. At this time, a variance for each feature value is calculated, and is used for weighted Euclidean distance calculation in which its inverse is made a weight coefficient.

This method itself is conventionally used. Reference vectors and weight vectors as to all target characters are stored in a dictionary 23. An average of distance elements is calculated for each of feature elements by using all training patterns over all of the thus stored reference vectors of the dictionary 23, and a list 24 of feature elements based on average distance in which dimensions of features are sorted in the descending order of the average is prepared. The respective feature elements of the respective reference vectors and weight vectors stored in the dictionary 23 are sorted in accordance with the list in the descending order of the distance element average. When the distance element average is large, it is expected that the distance element value in the feature element in the candidate character becomes large. Thus, in distance calculation explained later, the distance calculation is executed in the descending order of the distance element average. To this end, as to the feature vector extracted from the input pattern, the feature elements are sorted in accordance with the list of feature elements based on average distance in the feature sorting portion 13.

Figure 2:
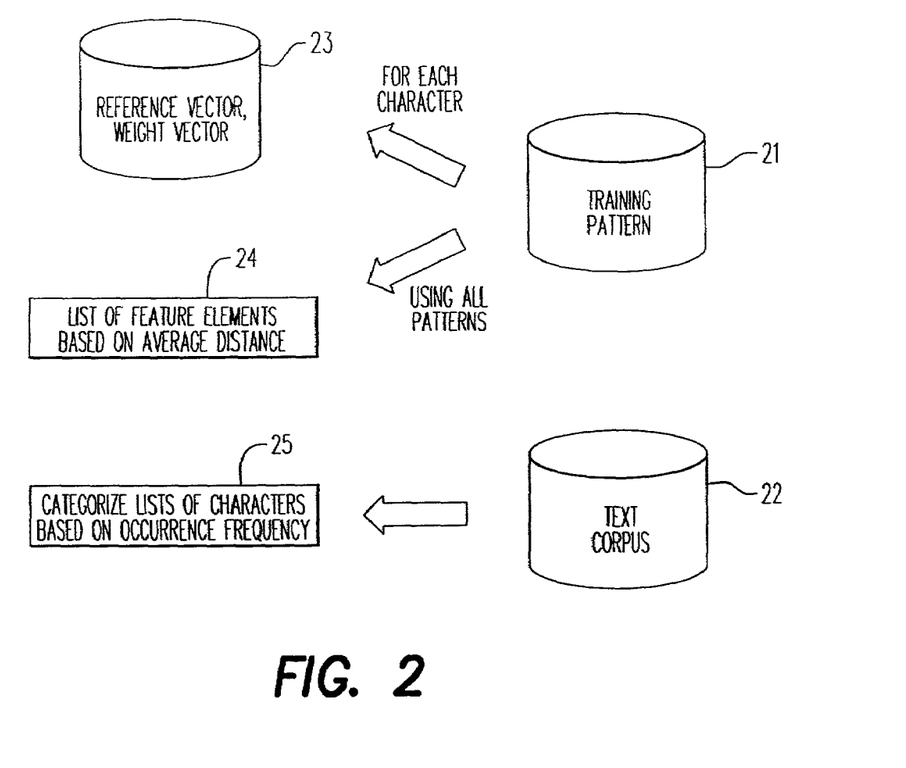
FIG. 2 is a block diagram for explaining a concept of a dictionary used in an embodiment of the present invention.

A text corpus of FIG. 2 is a set of documents generally used in a society and formed into text format, and is, for example, documents stored from information source such as online news. An occurrence frequency of each of characters is calculated from the set of the documents, and the characters are classified into three classes in accordance with the occurrence frequency. According to observation by the inventor, Chinese, Japanese, and Korean are classified using text corpora composed of about twenty million characters as shown in the following table.

TABLE 1

|  | Class 1 | | Class 2 | | Class 3 | |
| --- | --- | --- | --- | --- | --- | --- |
|  | number of characters | cover ratio | number of characters/number of accumulated characters | accumulated cover ratio | number of characters/number of accumulated characters | accumulated cover ratio |
| Chinese (simplified characters) | 450 | 74.95% | 1313/1764 | 97.00% | 2197/3961 | 99.89% |
| Chinese (Traditional characters) | 407 | 75.00% | 1344/1751 | 97.00% | 2206/3957 | 99.80% |
| Japanese | 382 | 80.01% | 1126/1508 | 99.00% | 1459/2967 | 99.96% |
| Korean | 282 | 90.75% | 940/1222 | 99.98% | 1410/2632 | 99.95% |

That is, with respect to Japanese, 382 characters of the highest occurrence frequency classified into class 1 occupy 80.01% of the text corpus, and when 1126 characters for class 2 of the next highest occurrence frequency are added to these, they occupy 99.00% of the text corpus. Further, 1459 characters of the low occurrence frequency classified into class 3 are added to these, they can cover 99.96% of the text corpus. This means that when a character recognition system of Japanese having about 6000 characters up to the JIS second level is structured, even if 2967 characters among those are targeted, the ratio of characters out of a candidate is only at most 0.04% and actual damage is not serious. Besides, it is understood that also in the 2967 characters, there is a considerable bias in statistical frequency. Similar observations are seen also in Chinese and Korean.

In the embodiment of the present invention, on the basis of the observation like this, the reference vectors contained in the dictionary 15 of the reference vectors are classified into three classes in accordance with Table 1. In distance calculation from the feature vector of the input pattern, first, distances as to the respective reference characters for the class 1 are calculated, and when there is a reference vector having a sufficiently small distance, that is, a sufficiently high approximation, the recognition processing is ended within the distance calculation as to the reference vectors for the class 1, and distance calculation as to the reference vectors for the class 2 and the class 3 is not performed. In this case, the distance calculation is ended within the distance calculation as to the 382 reference vectors, and the distance calculation as to the 1126 reference vectors for the class 2 and the 1459 reference vectors for the class 3 are omitted, so that a time of the distance calculation executed for the feature vector can be greatly shortened.

As a result of the distance calculation of the feature vector of the input pattern and the 382 reference vectors for the class 1, when there is no reference vector having a sufficiently small distance value, the distance calculation as to the 1508 reference vectors for the class 2 is executed, and when there is a reference vector having a sufficiently small distance value, calculation is ended within the distance calculation as to the reference vectors for the class 2, and the distance calculation as to the reference vectors for the class 3 is not performed. By this, a time of the distance calculation can be shortened.

Since the characters up to the class 2 occupy 99% of the text corpus, it is expected that there are characters of 1% in a given text in which a suitable character candidate can not be found by the distance calculation as to the reference vectors for the class 1 and the class 2. With respect to the feature vector of the input pattern of about 1%, distance calculation as to the reference vectors for the class 3 is started via the distance calculation as to the reference vectors for the class 1 and the class 2. In this way, among the reference vectors for the class 3, one having a small distance is selected as a character candidate.

When a character candidate is selected by the character candidate selection portion 14 in this way, the process proceeds to a processing portion 16 for similar characters. The processing portion 16 for the similar characters refers to a similar character dictionary 17 to improve accuracy of character recognition. In the similar character dictionary, a list of characters which are apt to be confused in character recognition is prepared for each of the characters. When the processing portion 16 for the similar characters receives one or plurality of character candidates from the character candidate selection portion 14, it refers to the similar character dictionary for each of the character candidates to read out similar characters, and reads out reference vectors of the similar characters from the reference vector dictionary 15.

The distance calculation of the feature vector extracted from the input pattern and the reference vectors of the plurality of similar characters is executed, and a predetermined number of characters are outputted as final character candidates in the ascending order of distance among the set containing the character candidates and the similar characters. Here, the term "final" means that a character recognition stage by the distance calculation is ended. In an actual character recognition program, thereafter, a process generally referred to as a post processing is executed. The post processing is a processing for determining priority order of the character candidates on the basis of analysis of a context, analysis of adjacency relation, occurrence probability of adjacent characters, and the like. Since the post processing itself is a conventionally used technique, the detailed description is omitted.

Class 1 Character Candidate Selection Process

Figure 3:
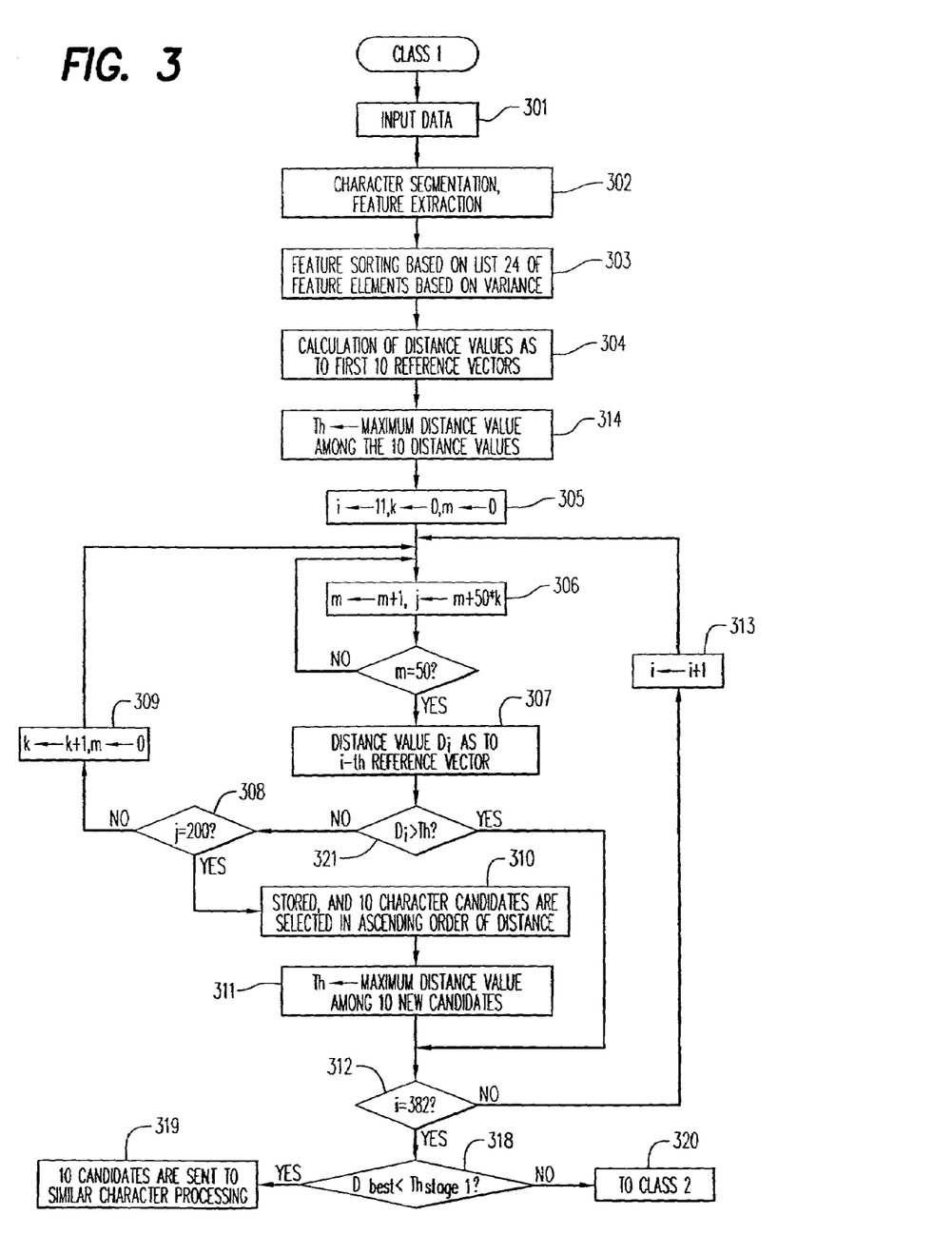
FIG. 3 is a flowchart showing a process for selecting a character candidate from reference vectors for class 1.

Next, a flow of a process of the character recognition system of the embodiment of the present invention will be described with reference to FIG. 3. This is a process for selecting 10 candidate characters from a candidate character set for the class 1. When an input pattern obtained by scanning a document through a scanner is transferred to the character recognition program of the embodiment of the present invention (301), respective character regions are segmented out of the image data in the character segmentation portion 11 (FIG. 1), and feature extraction as described above is performed in the feature extraction portion 12 (FIG. 1) with respect to the respective character regions (302). The feature vector extracted in this way is sent to the feature sorting portion 13, and features are sorted in the list of feature elements based on average distance explained in connection with FIG. 2 (303). Next, 10 distance values over all dimensions are calculated for the respective first ten reference vectors (304), and a threshold Th is set to the highest distance value among the 10 distance values calculated in this way (314). As the distance value, the weighted Euclidean distance is used, and is calculated as j=1 to 200 in expression 2 shown below. Then, the number i of a reference vector for class 1 read out from the reference vector dictionary 15 is set to 11, initial values of variables are set to k=0 and m=0 (305), the dimension j of the feature vector and the reference vector contained in the distance calculation is made j=m+50×k, and m is changed from 1 to 50 (306). In this way, a distance $D_i$ between the reference vector and the feature vector over the dimensions 1 to 50 is calculated from the following expression (307).

$$D_i = \Sigma w_j(x_j - r_j)^2 \qquad \text{[Numerical Expression 2]}$$

(j=1 to 50)

Here, $w_j$ is each element of a weight vector in each of the reference vectors explained in connection with the reference vector dictionary 23 of FIG. 2. The term $x_j$ expresses each element of the feature vector extracted from the input pattern, and $r_j$ expresses each element of the reference vector. A value of the square root of a value obtained by the expression 2 is a distance value called the weighted Euclidean distance. Here, for simplification, a value before the square root is taken is used as a standard of the weighted Euclidean distance and is called a distance. When the distance $D_i$ as to a reference vector exceeds the threshold Th (321), it is judged that this reference vector is disqualified as a character candidate to this feature vector. At this time, it is judged at step 312 whether or not comparison of the distance has been ended for all 382 reference vectors for the class 1, and if it is not ended, i is incremented and calculation of the distance $D_i$ as to a next reference vector is performed (307). When the distance $D_i$ as to the reference vector is the threshold (Th) or less (321), it is checked whether or not the dimension j reaches 200 (308), and if it does not reach 200, k is incremented (309), and a distance for the dimensions j of next 51 to 100 is calculated. In this way, the distance is calculated for j=51 to 100 and is added to the distance previously calculated for j=1 to 50, and the distance $D_1$ for j=1 to 100 is calculated (307).

As a result, when $D_1$ exceeds Th, i is incremented through step 312, and the process proceeds to a comparison with a next reference vector. If $D_i$ is Th or less, k is further incremented through step 309, and the distance $D_1$, that is, the distance $D_i$ for j=100 to 150 is calculated (307). This processing is repeated and when j reaches 200 while $D_i$ is in the state of Th or less, that is, if the distance $D_i$ including all dimensions is the threshold or less, a character corresponding to the reference vector at that time is stored in the memory as a character candidate which becomes a candidate of output of the system (310). In this memory, the character codes and distance values of the 10 reference vectors referred at the first of the process are stored. The new character candidate is input to this memory, and a character having the largest distance value among the previously stored character codes is deleted from the memory. In this way, in the memory, the 10 character candidates are stored in the ascending order of distance. Then, among the distance values of the 10 character candidates, the largest value is set as a new threshold Th (311). As a result of comparison with subsequent reference vectors, when a new character candidate is transferred to the memory, among the 10 character candidates previously stored in the memory, a character candidate having the largest distance value is deleted from the memory, and the new character candidate is added to the memory. Then, the largest distance value among the new 10 character candidates is set as a threshold Th.

Like this, after the number of the character candidates reaches 10, a threshold used for judgement at the block 307 is dynamically changed. In the block 312, when i=382 is satisfied, that is, when distance calculation as to all reference vectors for the class 1 is ended, it is judged whether or not the smallest distance value $D_{best}$ among the 10 character candidates stored in the memory is smaller than a class threshold $Th_{stage1}$ previously set for the character candidate selection of the class 1 (318). In this embodiment, $Th_{stage1}$ is set to, for example, 120,000. That a character candidate satisfying this condition exists means that a character candidate having a sufficiently high approximation is obtained in the character candidate selection processing in the class 1. Accordingly, in this case, the 10 character candidates stored in the memory are transferred to the similar character processing portion 16, and the character candidate selection processing (14) as to the feature vector of this input pattern is ended.

Class 2 Character Candidate Selection Process

When the condition of the block 318 is not satisfied, a process for selecting a character candidate from the reference vectors for the class 2 is started (320). The character candidate selection process of the class 2 will be described with reference to FIG. 4. Now, since the character recognition of Japanese is performed, reference vectors and weight vectors for 1126 target characters are stored as the reference vectors for the class 2 in the reference vector dictionary 15. When the character candidate selection process of the class 2 is started, initial setting is carried out to make i=1, k=0, and m=0 (502), the dimension j of the feature vector and the reference vector of distance calculation is made j=m+50×k, m is changed from 1 to 50 (503), and calculation of distance value $D_i$ between the i-th reference vector and the feature vector extracted from the input pattern is executed (504). When the distance value $D_i$ is larger than the threshold Th (515), and i does not reach i=1126 (510), i is incremented (511), and the process proceeds to a calculation of a distance value as to a next reference vector.

Figure 4:
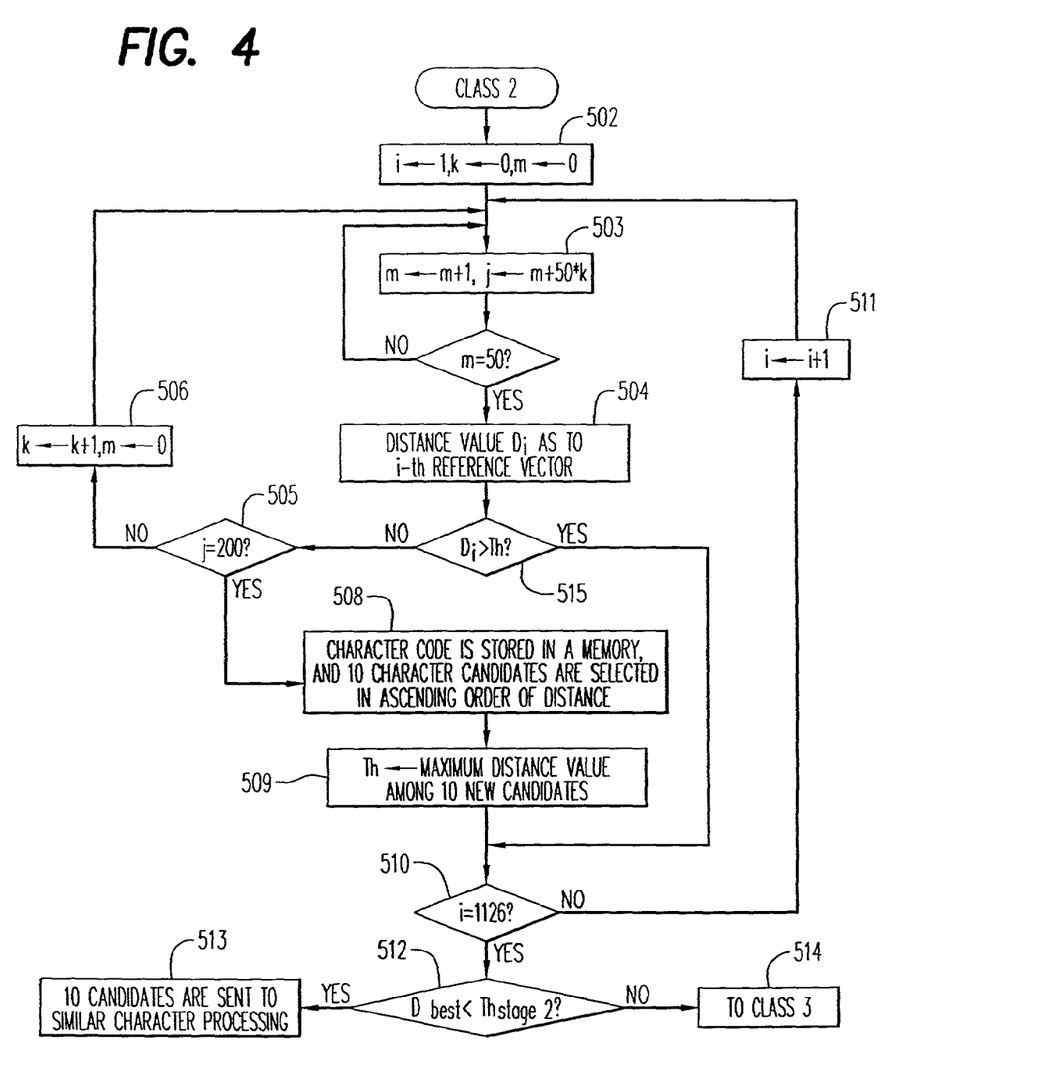
FIG. 4 is a flowchart showing a process for selecting a character candidate from reference vectors for class 2.

When the distance value $D_i$ is the threshold Th or less, k is incremented, a distance value is calculated for next 50 dimensions, that is, j=51 to 100, and the value is added to the distance value previously calculated for j=1 to 50 to calculate the distance value $D_1$ for j=1 to 100 (504). When the distance value $D_1$ exceeds Th and i does not reach i=1126 (510), i is incremented and the process proceeds to distance calculation as to a next reference vector (511). When $D_1$ does not exceed Th, k is incremented, j is incremented to next 50 dimensions, and the distance value $D_1$ for j=1 to 150 is calculated by the same process as the above (504). When this process is repeated and j reaches j=200 while $D_1$ is in the state where it does not exceed Th (505), a character code corresponding to this reference vector is input to the memory (508). In the memory, the character candidates selected in the previous class 1 character candidate selection process are stored. If the number of the character candidates reaches 10, a character candidate having the largest distance value is deleted from the memory, and the new character candidate is added, so that the number of the character candidates is kept 10. Then, the largest distance value among the distance values of the 10 character candidates is made a new threshold Th (509).

Thereafter, when the reference vector passes through the test of the block 515 and is input to the memory (508), replacement of the character candidate similar to the above is performed, and the threshold Th is dynamically changed. When i=1126 is satisfied in the block 510, that is, when the character candidate selection process is executed for all 1126 reference vectors for the class 2, it is judged whether or not the smallest distance value of the 10 character candidates stored in the memory is smaller than a class threshold $Th_{stage2}$ of the class 2 (512), and if it is smaller, the character candidate selection process (14) is ended, and the 10 character candidates are transferred to the similar character processing portion 16 (FIG. 1) In this embodiment, $Th_{stage2}$ is set to, for example, 150,000 larger than $Th_{stage1}$. That is, the class threshold of the class 2 is made looser than the threshold of the class 1. When the condition of the block 512 is not satisfied, the process proceeds to a character candidate selection process as to the reference vectors for the class 3.

Class 3 Character Candidate Selection Process

Figure 5:
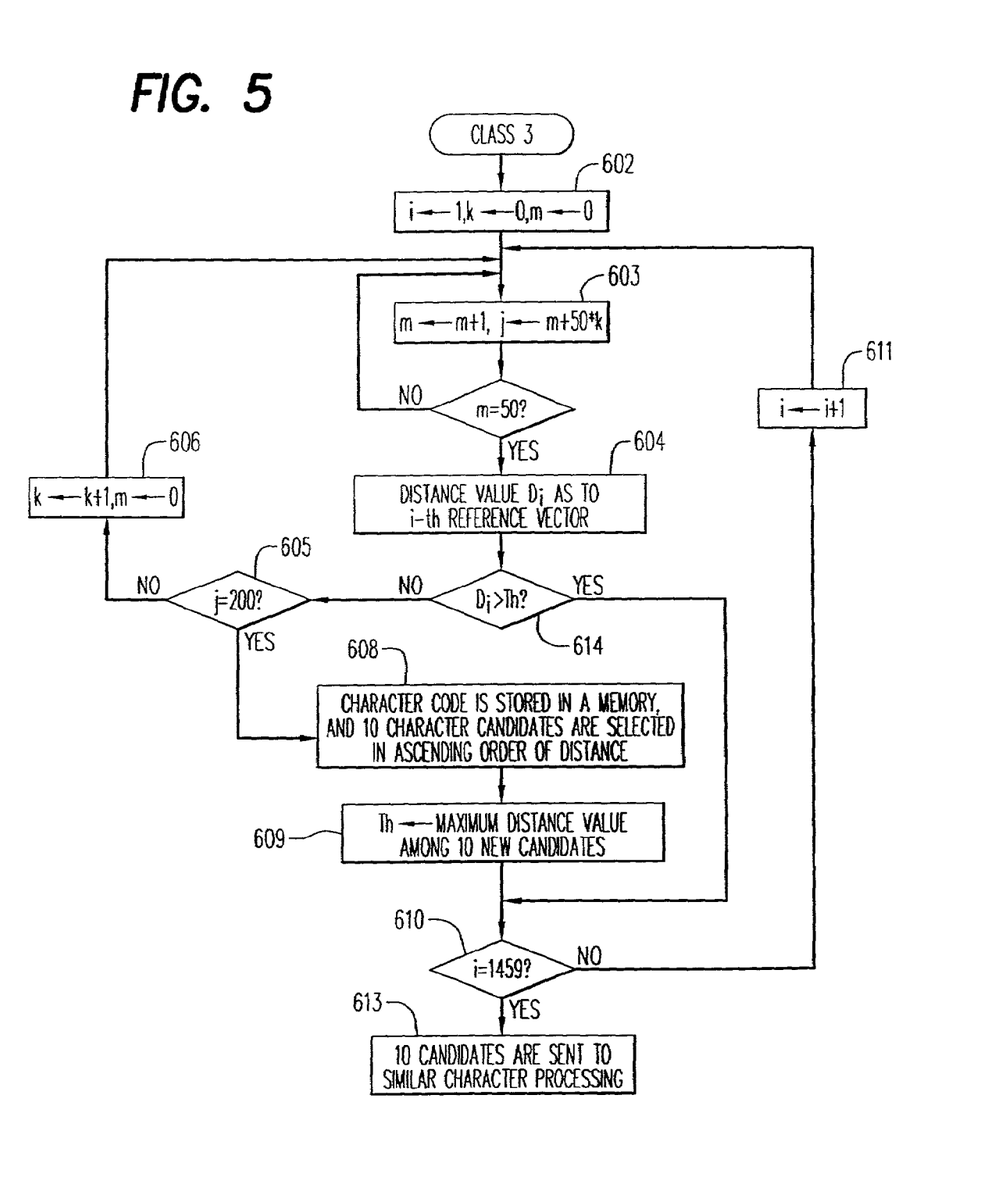
FIG. 5 is a flowchart showing a process for selecting a character candidate from reference vectors for class 3.

FIG. 5 is a character candidate selection process as to 1459 reference vectors for the class 3. Blocks 602 to 610 are the same as the blocks 502 to 510 of FIG. 4 except that judgement of the block 610 is the numeral 1459 of the reference vectors for the class 3. Accordingly, explanation of functions of these blocks is omitted. When i=1459 is satisfied at the block 610 and the character candidate selection process is ended for all 1459 reference vectors for the class 3, the character candidate selection process is ended, and the 10 character candidates stored in the memory are transferred to the similar character processing portion 16. At this time, when the number of character candidates stored in the memory is less than 10, all the character candidates are transferred to the similar character processing portion 16.

Similar Character Processing

Figure 6:
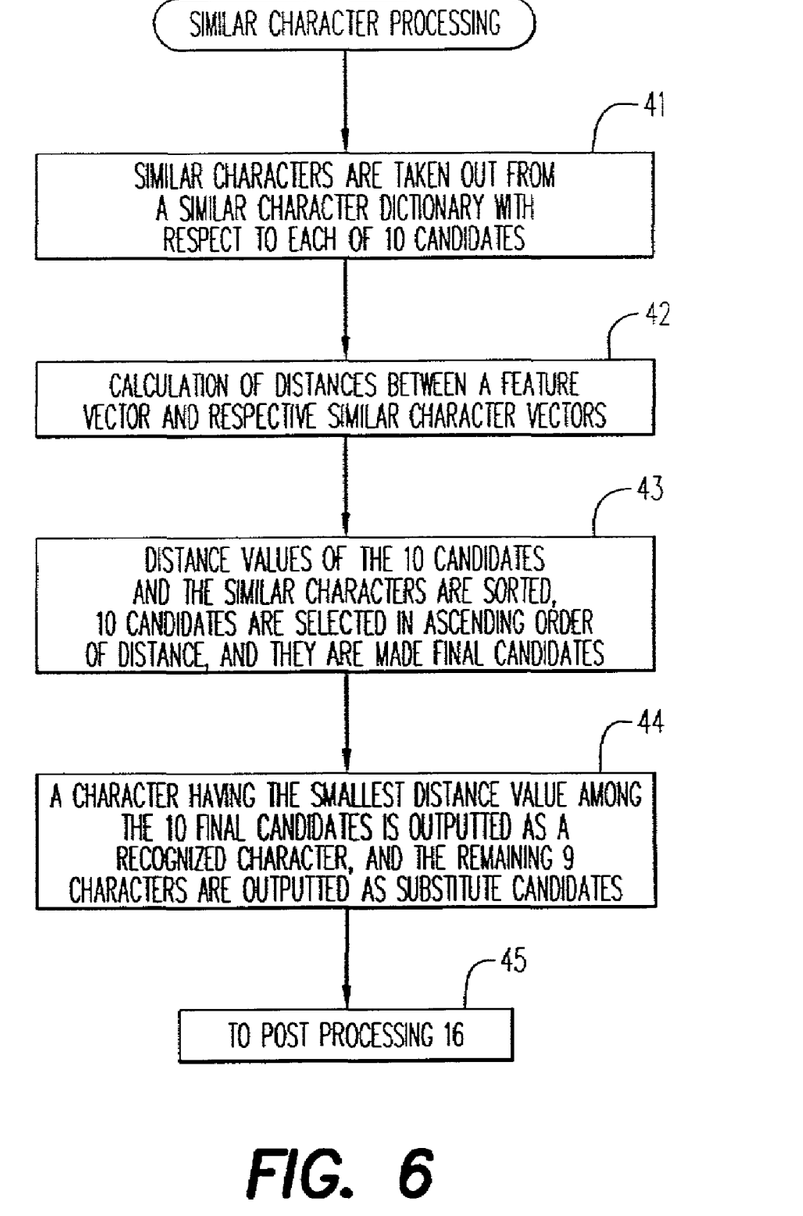
FIG. 6 is a flowchart showing a process of similar character processing.

Next, a process of similar character processing will be described with reference to FIG. 6. When the similar character is processing portion 16 of FIG. 1 receives the 10 character candidates from the character candidate selection portion 14, it refers to the similar character dictionary for each of the character candidates, and reads out similar characters (41). Reference vectors and weight vectors of the similar characters are read out from the reference vector dictionary 15, and a distance value from the feature vector extracted from the input pattern is calculated (42). After weighted Euclidean distances are calculated for all the readout similar characters, the distance values of the 10 character candidates and these similar characters are sorted, and 10 characters are selected in the ascending order of the distance value (43).

Among the 10 final candidates obtained in this way, one having the smallest distance value is outputted as a recognized character, and the remaining 9 candidates are outputted as substitute candidates. Here, although selection of the character candidate is performed on the basis of only the comparison with the reference vectors as to target characters, at the halfway stage of the character candidate selection, or at the stage of the completion of the character candidate selection, it is preferable to change the priority of character candidates on the basis of grammatical analysis of a text, adjacency relation of words, dependency relation between characters, and the like, that is, to execute the so-called post processing.

As the output of the OCR program, a text as a set of characters of highest priority obtained in this way is presented to the user. The user can find a recognition error in the OCR output from a context of the text. In this case, when the user clicks the error character, nine substitute characters are displayed in a pull-down form, and when the user clicks one of them, the character is substituted for the error character.

Although the present invention has been described on the specific embodiment, the present invention is not limited to the embodiment like this.

What is claimed is:

1. A character recognition system comprising:
a computer that performs character recognition by comparing distances between a feature vector extracted from an input pattern and reference vectors of previously stored target characters, wherein all characters are classified into plurality of classes based on occurrence frequencies of the target characters,
a dictionary storage device for storing the reference vectors for each of the classes,
wherein the computer is programmed to calculate distances between the feature vector and the reference vectors of a plurality of characters belonging to a class having a highest character occurrence frequency among the plurality of classes, and to select, when there is a distance smaller than a class threshold determined for the class, a character of a reference vector corresponding to the distance as a character candidate, and
a list indicating order of average distance of features of a number of reference vectors,
wherein the computer is programmed such that after features of the feature vector extracted from the input pattern are sorted in accordance with the list in descending order of average distance, first, with respect to features up to an n-th feature and with respect to one of the reference vectors, a distance as to the corresponding features is calculated, (1) the distance is compared with a character candidate selection threshold, (2) if the distance is not larger than the threshold, a distance including next n features is calculated, procedures of (1) and (2) are repeated, and when the distance exceeds the character candidate selection threshold, a comparison with a next reference vector is started.

2. The system according to claim 1, wherein the computer is programmed to store a character corresponding to the reference vector, which was a comparison object, as a character candidate in a memory when a distance value based on all the features do not exceed the character candidate selection threshold.

3. The system according to claim 2, wherein the computer is programmed to dynamically set a distance value of a character candidate having an m-th smallest distance value as a character candidate selection threshold, m being the number of character candidates to be selected.

4. The system according to claim 3, wherein the computer is programmed such that when distance calculation of the feature vector as to the reference vectors belonging to the class having the highest character occurrence frequency is completed, and when one or a plurality of said calculated distances are smaller than a threshold determined for the class, m characters corresponding to the reference vectors having distances of from the smallest distance to the m-th smallest distance are selected as character candidates.

5. A character recognition system comprising:
a computer that performs character recognition by comparing distances between a feature vector extracted from an input pattern and reference vectors of previously stored target characters, wherein all characters are classified into a plurality of classes based on occurrence frequencies of the target characters,
a dictionary storage device for storing the reference vectors for each of the classes and a computer are included,
wherein the computer is programmed to calculate distances between the feature vector and the reference vectors of a plurality of characters belonging to a class having a highest character occurrence frequency among the plurality of classes, and to select, when there is a distance smaller than a class threshold determined for the class, a character of a reference vector corresponding to the distance as a character candidate, and
a similar character dictionary for providing characters having similar relations to arbitrary characters, wherein the computer is programmed to take out characters similar to the respective character candidates from the similar character dictionary in response to a selection of the plurality of character candidates, to calculate distances between the feature vector to be recognized and reference vectors of the similar characters, to sort distance values of the plurality of character candidates and distance values of the similar characters, and to select a predetermined number of characters in ascending order of distance as recognition character candidates.

6. A character recognition system comprising:
a computer that performs character recognition by comparing distances between a feature vector extracted from an input pattern and reference vectors of previously stored target characters, wherein all characters are classified into a plurality of classes based on occurrence frequencies of the target characters,
a dictionary storage device for storing the reference vectors for each of the classes and a computer are included,
wherein the computer is programmed to calculate distances between the feature vector and the reference vectors of a plurality of characters belonging to a class having a highest character occurrence frequency among the plurality of classes, and to select, when there is a distance smaller than a class threshold determined for the class, a character of a reference vector corresponding to the distance as a character candidate, wherein the computer is programmed to calculate distances between the feature vector and the reference vectors of a plurality of characters belonging to a class having a second highest character occurrence frequency when there is no distance smaller than the class threshold, and to select, when there is a distance smaller than a second class threshold determined for the class, a character of a reference vector corresponding to the distance as a candidate character, and
a similar character dictionary for providing characters having similar relations to arbitrary characters, wherein the computer is programmed to take out characters similar to the respective character candidates from the similar character dictionary in response to selection of the plurality of character candidates, to calculate distances between the feature vector to be recognized and reference vectors of the similar characters, to sort distance values of the plurality of character candidates and distance values of the similar characters, and to output a predetermined number of characters in ascending order of distance as recognition character candidates.

7. A character recognition system for performing character recognition by comparing distances between a feature vector extracted from a pattern of an input character and reference vectors of patterns of previously stored target characters, comprising:
   a dictionary storage device for storing information indicating descending order of average distance prepared by calculating average distance values of features of the reference vectors of the target characters over substantially all characters and the reference vectors; and a computer,
   wherein the computer is programmed to calculate a distance between the feature vector of the input character and each of the plurality of reference vectors, to set a relatively small distance value among calculated distance values as a threshold, to calculate a distance between a next reference vector and the feature vector up to a fraction of a predetermined dimension, to stop the distance calculation as to the reference vector when a distance value at the fraction of the predetermined dimension exceeds the threshold, and to proceed to distance calculation as to a next reference vector.

8. The system according to claim 7, wherein when the distance value at the fraction of the predetermined dimension does not exceed the threshold, the computer calculates a distance value up to a second fraction of the predetermined dimension, and stops the distance calculation as to the reference vector when the distance value at the second fraction of the predetermined dimension exceeds the threshold, and proceeds to distance calculation as to a next reference vector.

9. A character recognition system comprising:
   a computer that performs character recognition by comparing distances between a feature vector extracted from a pattern of an input character and reference vectors of previously stored target characters, wherein the computer comprises:
   a dictionary storage device in which all characters are classified into plurality of classes based on occurrence frequencies of the target characters and the reference vectors are stored together with classification information;
   distance calculation means for calculating distances between the feature vector and the reference vectors of plurality of characters belonging to a class having a highest character occurrence frequency among the plurality of classes; and
   selection means for selecting a character candidate based on distance calculation as to the reference vectors of the characters belonging to the class having the highest character occurrence frequency when distances calculated by the distance calculation means as to one or plurality of characters belonging to the class having the highest character occurrence frequency are smaller than a predetermined threshold, and
   a list indicating order of average distance of features of a number of reference vectors,
   wherein the computer is programmed such that after features of the feature vector extracted from the input pattern are sorted in accordance with the list in descending order of average distance, first, with respect to features up to an n-th feature and with respect to one of the reference vectors, a distance as to the corresponding features is calculated, (1) the distance is compared with a character candidate selection threshold, (2) if the distance is not larger than the threshold, a distance including next n features is calculated, procedures of (1) and (2) are repeated, and when the distance exceeds the character candidate selection threshold, a comparison with a next reference vector is started.

10. A character recognition method in which all characters are classified into plurality of classes based on occurrence frequencies of target characters, wherein a computer provided with a dictionary storage device for storing the reference vectors for each of the classes is used, and wherein distances between a feature vector extracted from an input pattern and the reference vectors of previously stored target characters are compared to perform character recognition, the method comprising the steps of:
   (a) calculating distances between the feature vector and the reference vectors of plurality of characters belonging to a class having a highest character occurrence frequency among the plurality of classes;
   (b) selecting, when there is a distance smaller than a class threshold determined for the class, a character of a reference vector corresponding to the distance as a candidate character, wherein a list indicating order of average distance of features of a number of reference vectors is used;
   (c) sorting features of the feature vector extracted from the input pattern in accordance with the list in descending order of average distance, and then, calculating a distance as to corresponding features with respect to one of the reference vectors and with respect to features up to an n-th feature;
   (d) repeating following steps (d-1) and (d-2), and proceeding to a comparison with a next reference vector when the distance exceeds a character candidate selection threshold,
   (d-1) comparing the distance with the character candidate selection threshold, and
   (d-2) calculating a distance including next n features if the distance is not larger than the threshold.

11. The method according to claim 10, wherein when a distance including all the features does not exceed the character candidate selection threshold, a character corresponding to the reference vector, which was a comparison object, is stored as a character candidate in a memory.

12. The method according to claim 11, further comprising a step of dynamically setting a distance value of a character candidate having an m-th smallest distance value as a character candidate selection threshold, m being the number of character candidates to be selected.

13. The method according to claim 12, wherein when distance calculation of the feature vector as to the reference vectors belonging to the class having the highest character occurrence frequency is completed, when one or a plurality of calculated distances are smaller than a threshold determined for the class, m characters corresponding to the reference vectors having distances of from the smallest distance to the m-th smallest distance are selected as character candidates.

14. A character recognition method in which all characters are classified into a plurality of classes based on occurrence frequencies of target characters, wherein a computer provided with a dictionary storage device for storing the reference vectors for each of the classes is used, and wherein distances between a feature vector extracted from an input pattern and the reference vectors of previously stored target characters are compared to perform character recognition, the method comprising the steps of:
- (a) calculating distances between the feature vector and the reference vectors of plurality of characters belonging to a class having a highest character occurrence frequency among the plurality of classes;
- (b) selecting, when there is a distance smaller than a class threshold determined for the class, a character of a reference vector corresponding to the distance as a candidate character, wherein a similar character dictionary for providing characters having similar relations to arbitrary characters is used;
- (c) taking out characters similar to the respective character candidates from the similar character dictionary in response to a selection of the plurality of character candidates;
- (d) calculating distances between the feature vector to be recognized and reference vectors of the similar characters;
- (e) sorting distance values of the plurality of character candidates and distance values of the similar characters; and
- (f) outputting a predetermined number of characters in ascending order of distance as recognition character candidates.

15. A character recognition method in which all characters are classified into a plurality of classes based on occurrence frequencies of target characters, wherein a computer provided with a dictionary storage device for storing the reference vectors for each of the classes is used, and wherein distances between a feature vector extracted from an input pattern and the reference vectors of previously stored target characters are compared to perform character recognition, the method comprising the steps of:
- (a) calculating distances between the feature vector and the reference vectors of plurality of characters belonging to a class having a highest character occurrence frequency among the plurality of classes;
- (b) selecting, when there is a distance smaller than a class threshold determined for the class, a character of a reference vector corresponding to the distance as a candidate character;
- (c) calculating, when there is no distance smaller than the class threshold, distances between the feature vector and the reference vectors of plurality of characters belonging to a class having a second highest character occurrence frequency;
- (d) selecting, when there is a distance smaller than a second class threshold determined for the class, a character of a reference vector corresponding to the distance as a candidate character, wherein a similar character dictionary for providing characters having similar relations to arbitrary characters is used;
- (e) taking out characters similar to the respective character candidates from the similar character dictionary in response to a selection of the plurality of character candidates, and calculating distances between the feature vector to be recognized and reference vectors of the similar characters; and
- (f) sorting distance values of the plurality of character candidates and distance values of the similar characters, and outputting a predetermined number of characters in ascending order of distance as recognition character candidates.

16. A computer readable recording medium storing a dictionary in which all characters are classified into plurality of classes based on occurrence frequencies of target characters, and reference vectors are stored for each of the classes, and a computer program executing the steps of:
- (a) calculating distance values between a feature vector extracted from an input pattern and reference vectors of plurality of characters belonging to a class having a highest character occurrence frequency among the plurality of classes; and
- (b) selecting, when there is a distance value smaller than a class threshold determined for the class having the highest character occurrence frequency, a character of a reference vector having the distance as a character candidate, wherein a list indicating order of average distance of features of a number of reference vectors is further stored on said medium,
- (c) sorting features of the feature vector extracted from the input pattern in accordance with the list in descending order of average distance, and then, calculating a distance as to corresponding features with respect to one of the reference vectors and with respect to features up to an n-th feature; and
- (d) repeating following steps (d-1) and (d-2), and proceeding to a comparison with a next reference vector when the distance exceeds a character candidate selection threshold,
- (d-1) comparing the distance with the character candidate selection threshold, and
- (d-2) calculating a distance including next n features if the distance is not larger than the threshold.

17. A computer readable medium that stores a program that causes a computer to perform character recognition, said program comprising instructions that cause said computer to:
- compare distances between a feature vector extracted from an input pattern and reference vectors of previously stored target characters, wherein all characters are classified into plurality of classes based on occurrence frequencies of the target characters,
- access a stored dictionary of the reference vectors for each of the classes,
- to calculate distances between the feature vector and the reference vectors of a plurality of characters belonging to a class having a highest character occurrence frequency among the plurality of classes, and to select, when there is a distance smaller than a class threshold determined for the class, a character of a reference vector corresponding to the distance as a character candidate, and
- to use a similar character dictionary for providing characters having similar relations to arbitrary characters, in taking out characters similar to the respective character candidates from the similar character dictionary in response to a selection of the plurality of character candidates,
- to calculate distances between the feature vector to be recognized and reference vectors of the similar characters,
- to sort distance values of the plurality of character candidates and distance values of the similar characters, and
- to select a predetermined number of characters in ascending order of distance as recognition character candidates.

* * * * *